(12) United States Patent
Kitamura et al.

(10) Patent No.: US 8,339,523 B2
(45) Date of Patent: Dec. 25, 2012

(54) TELEVISION APPARATUS AND ELECTRONIC APPARATUS

(75) Inventors: Tomoko Kitamura, Ome (JP); Satoshi Yokote, Ome (JP); Masataka Tokoro, Tachikawa (JP); Kohei Wada, Tachikawa (JP); Ryosuke Kasaya, Sagamihara (JP); Tetsuo Okazaki, Hino (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 15 days.

(21) Appl. No.: 12/954,372

(22) Filed: Nov. 24, 2010

(65) Prior Publication Data

US 2011/0285924 A1 Nov. 24, 2011

(30) Foreign Application Priority Data

May 18, 2010 (JP) ................. 2010-114637

(51) Int. Cl.
- *H04N 5/64* (2006.01)
- *G06F 1/16* (2006.01)
- *H05K 5/00* (2006.01)
- *H05K 7/00* (2006.01)
- *H01L 41/00* (2006.01)
- *H02N 2/00* (2006.01)
- *G09G 5/00* (2006.01)

(52) U.S. Cl. ............. 348/836; 361/679.37; 310/323.05; 345/156

(58) Field of Classification Search .................... 348/836
See application file for complete search history.

(56) References Cited

U.S. PATENT DOCUMENTS

| 5,153,817 A * | 10/1992 | Hosoi et al. ............. 361/679.37 |
| 2003/0184514 A1 | 10/2003 | Grosfeld et al. |
| 2005/0062346 A1 * | 3/2005 | Sasaki ............................ 310/12 |
| 2006/0232564 A1 | 10/2006 | Nishimura et al. |
| 2009/0303176 A1 * | 12/2009 | Chen et al. .................... 345/156 |

FOREIGN PATENT DOCUMENTS

| JP | 58-138769 A2 | 9/1983 |
| JP | 2000-137576 | 5/2000 |
| JP | 2006-215849 | 8/2006 |
| JP | 2008-017327 | 1/2008 |
| JP | 2010-020385 | 1/2010 |
| JP | 2010-032653 | 2/2010 |
| JP | 2011-175777 A2 | 9/2011 |

OTHER PUBLICATIONS

Notice of Reasons for Rejection mailed by the Japan Patent Office on Apr. 19, 2011 in corresponding Japanese application No. 2011-058030 in 5 pages.
Notice of Reasons for Rejection for Japanese Patent Application 2011-175777 (English Translation) mailed Oct. 25, 2011.

* cited by examiner

*Primary Examiner* — Behrooz Senfi
*Assistant Examiner* — Hee-Yong Kim
(74) *Attorney, Agent, or Firm* — Knobbe, Martens, Olson & Bear LLP

(57) ABSTRACT

According to one embodiment, a television apparatus includes a housing, a vibration module attached to the housing, a supporting portion which is secured to the housing and supports the vibration module for vibration, and an oscillation unit which causes the vibration module to vibrate. In addition, the television apparatus includes a plurality of first projections protruding from one of the vibration module and the housing toward the other, a sheet spanning between respective distal end portions of the first projections, and a plurality of second projections provided on the other of the vibration module and the housing and abutting the sheet at positions between the first projections.

18 Claims, 15 Drawing Sheets

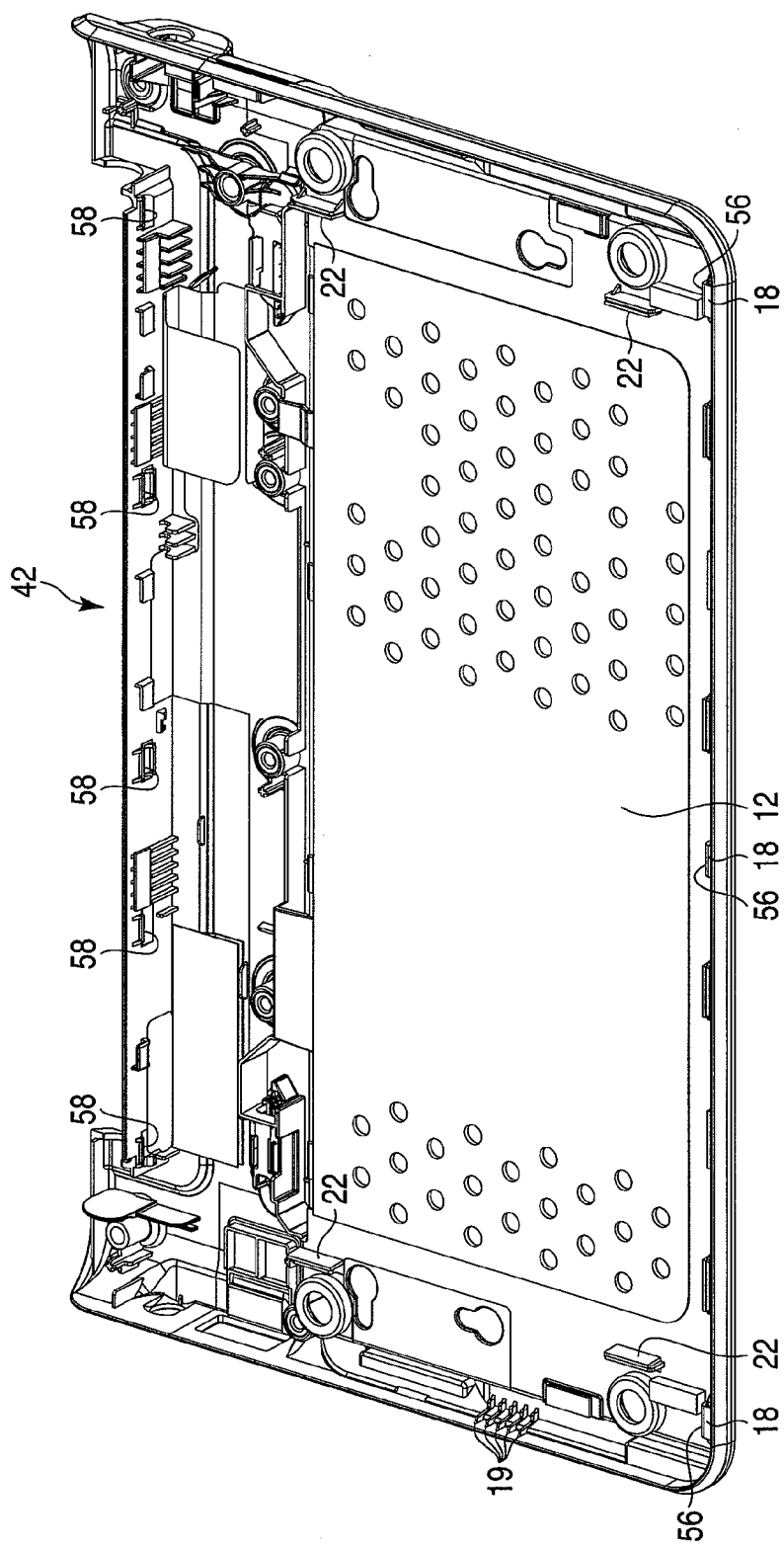
F I G. 8

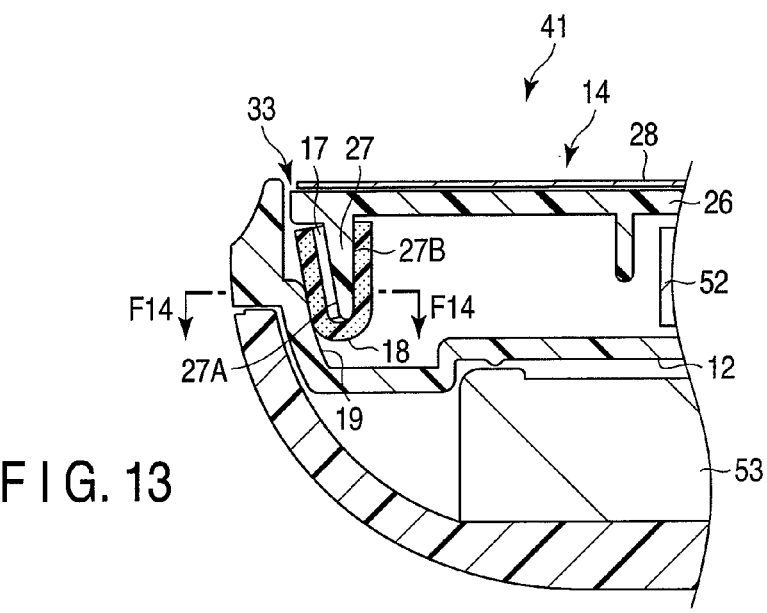
F I G. 13
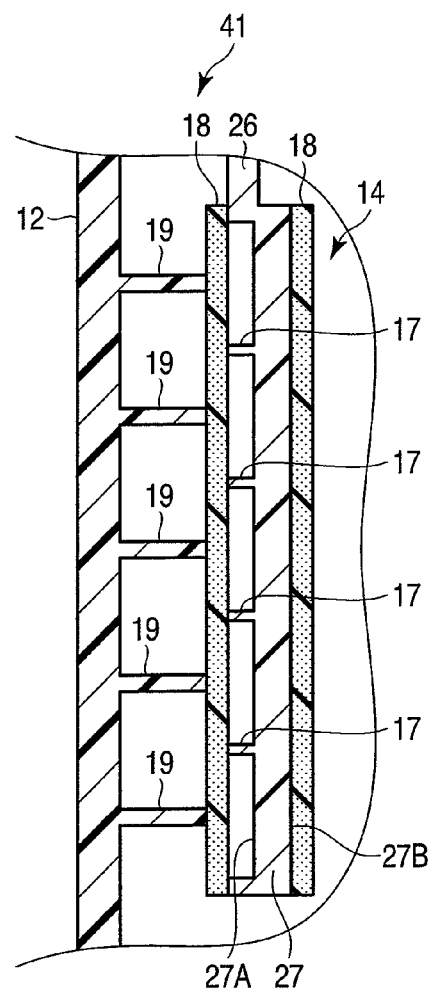
F I G. 14

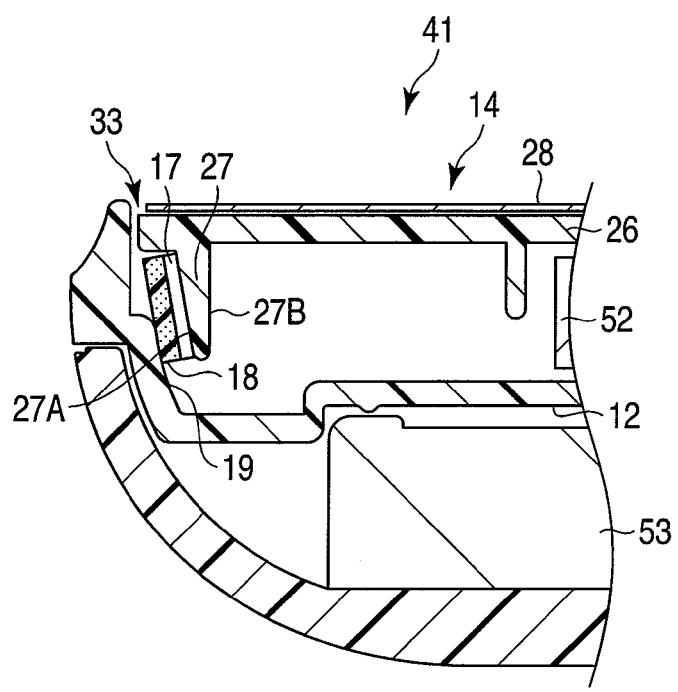
F I G. 16
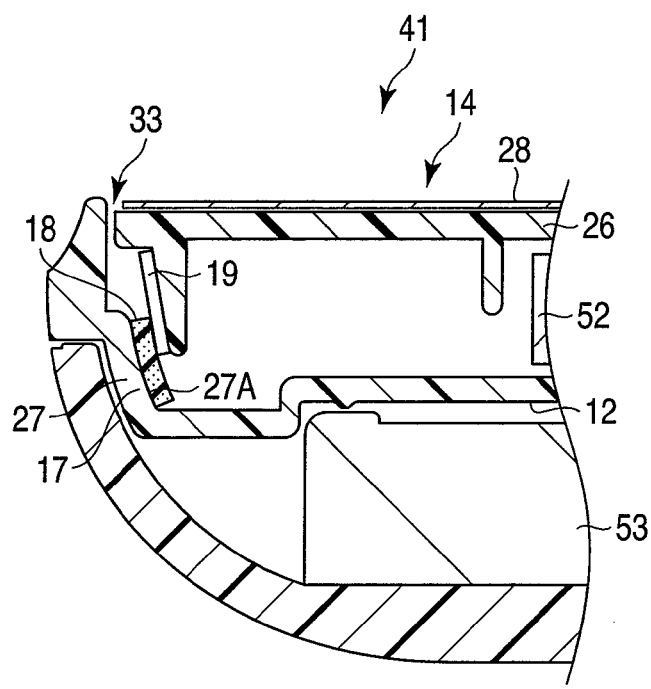
F I G. 17

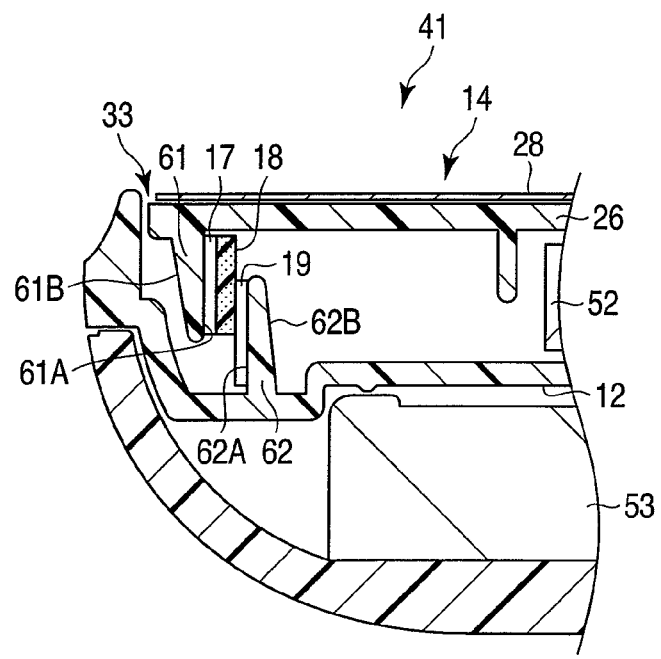
F I G. 18
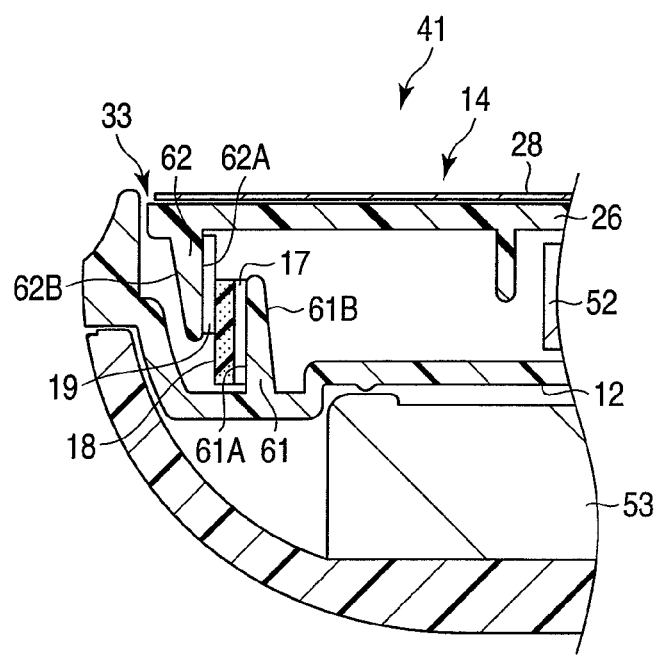
F I G. 19

TELEVISION APPARATUS AND ELECTRONIC APPARATUS

CROSS-REFERENCE TO RELATED APPLICATIONS

This application is based upon and claims the benefit of priority from Japanese Patent Application No. 2010-114637, filed May 18, 2010; the entire contents of which are incorporated herein by reference.

FIELD

Embodiments described herein relate generally to a television apparatus and an electronic apparatus provided with a vibration module.

BACKGROUND

Cell phones and other electronic apparatuses are generally provided with a vibration function to cause their housing to vibrate. In such electronic apparatus with the vibration function, vibrations are used in various manners for various applications. In a cell phone, for example, a vibration is used to notify its user of receipt of a call or e-mail.

The vibration function has conventionally been assigned to the electronic apparatus of this type. However, if this function is given to some television apparatuses, for example, it is not advisable to produce vibration sounds in some cases. Thus, there has been a demand for a technique for suppressing vibrational sounding.

BRIEF DESCRIPTION OF THE DRAWINGS

A general architecture that implements the various feature of the embodiments will now be described with reference to the drawings. The drawings and the associated descriptions are provided to illustrate the embodiments and not to limit the scope of the invention.

FIG. 8 is an exemplary perspective view showing a housing of the portable computer of FIG. 6 with the vibration module and second display removed;

FIG. 13 is an exemplary sectional view of the main unit of the portable computer taken along line F13-F13 of FIG. 7;

FIG. 14 is an exemplary sectional view of the portable computer taken along line F14-F14 of FIG. 13;

FIG. 16 is an exemplary sectional view showing first and second projections and a sheet of a portable computer as an example of an electronic apparatus according to a fifth embodiment;

FIG. 17 is an exemplary sectional view showing first and second projections and a sheet of a portable computer as an example of an electronic apparatus according to a sixth embodiment;

FIG. 18 is an exemplary sectional view showing first and second projections and a sheet of a portable computer as an example of an electronic apparatus according to a seventh embodiment; and FIG. 19 is an exemplary sectional view showing first and second projections and a sheet of a portable computer as an example of an electronic apparatus according to an eighth embodiment.

DETAILED DESCRIPTION

Various embodiments will be described hereinafter with reference to the accompanying drawings.

In general, according to one embodiment, a television apparatus includes: a housing; a vibration module attached to the housing; a supporting portion which is secured to the housing and supports the vibration module for vibration; and an oscillation unit which causes the vibration module to vibrate. In addition, the television apparatus includes: a plurality of first projections protruding from one of the vibration module and the housing toward the other; a sheet spanning between respective distal end portions of the first projections; and a plurality of second projections provided on the other of the vibration module and the housing and abutting the sheet at positions between the first projections.

Figure 1:
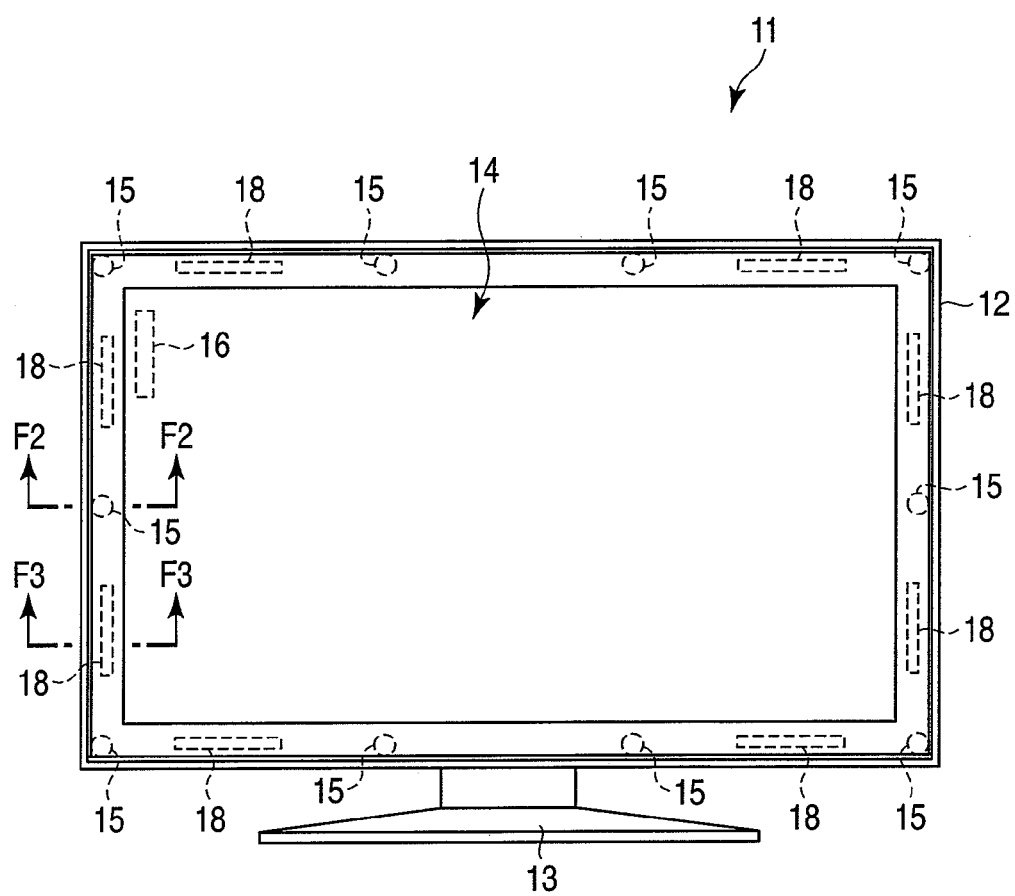
FIG. 1 is an exemplary front view showing a television apparatus as an example of an electronic apparatus according to a first embodiment.

As shown in FIG. 1, a television apparatus as an example of an electronic apparatus according to a first embodiment is a thin display device with a rectangular appearance. This television apparatus 11 comprises a housing 12, leg 13 that supports the housing 12, and vibration module 14 attached to the housing 12.

Figure 2:
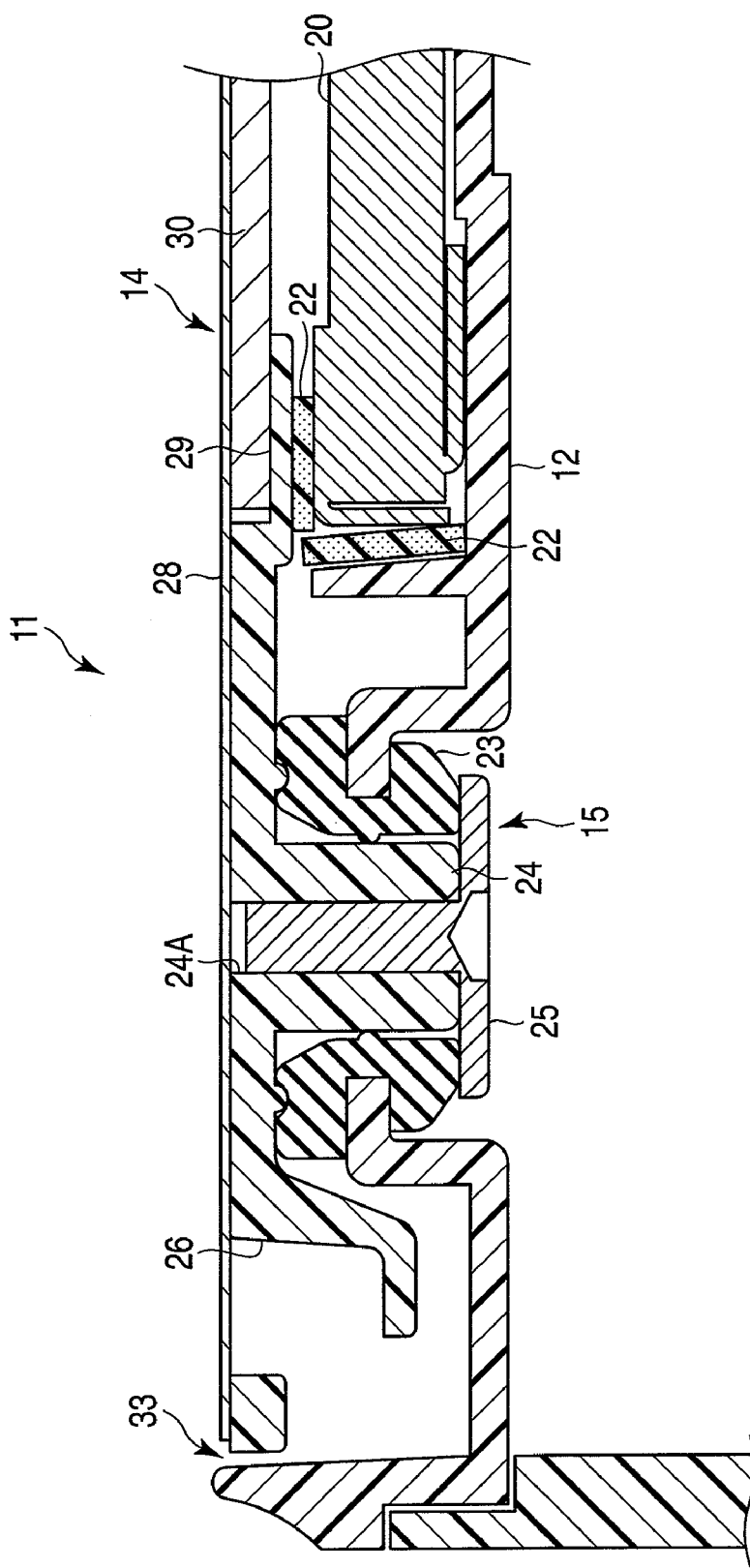
FIG. 2 is an exemplary sectional view of the television apparatus taken along line F2-F2 of FIG. 1.
Figure 3:
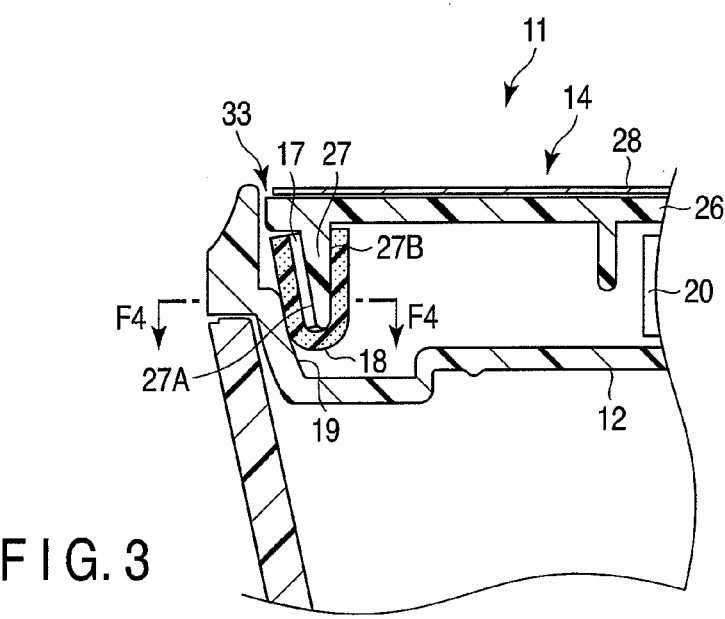
FIG. 3 is an exemplary sectional view of the television apparatus taken along line F3-F3 of FIG. 1.

As shown in FIGS. 1 to 3, the television apparatus 11 comprises support portions 15, oscillation unit 16, first projections 17, sheets 18, second projections 19, and flat display panel 20. The supporting portions 15 support the vibration module 14 for vibration. The oscillation unit 16 causes the vibration module 14 to vibrate. The first projections 17 protrude from the vibration module 14 toward the housing 12. The sheets 18 are provided spanning between the respective distal end portions of the first projections 17. The second projections 19 protrude from the housing 12 toward the vibration module 14. The display panel 20 is secured to the inner surface of the housing 12. The display panel 20 is formed of, for example, a liquid crystal.

The display panel 20 is held in a floating manner in the housing 12 by the supporting portions 15. The display panel 20 is secured to the housing 12 and a cover 26 of the vibration module 14 with a cushion member 22, such as a sponge-rubber sheet, between them. The oscillation unit 16 shown in FIG. 1 comprises, for example, a motor and eccentric weight that is rotated by the motor. The oscillation unit 16 is secured to, for example, the vibration module 14.

As shown in FIG. 2, each supporting portion 15 is secured to the housing 12. The supporting portion 15 comprises a ring-like elastic bush 23, cylindrical boss portion 24, and screw 25. The bush 23 is interposed between the vibration module 14 and housing 12. The boss portion 24 protrudes from the cover 26 so as to be fittable into the bush 23. The screw 25 is a fixing member that is fitted in a through-hole 24A in the boss portion 24. The elastic bush 23 is a cylinder of a soft, flexible, elastic material such as elastomer (e.g., synthetic rubber).

As shown in FIGS. 2 and 3, the vibration module 14 is separated from the housing 12 and can be driven to vibrate independently of the housing 12 by the oscillation unit 16. The vibration module 14 comprises a flat frame-like cover (top cover) 26, square plate-like portions 27, flat glass plate 28, recess 29, and touch panel 30. Each plate-like portion 27 protrudes from the inner surface of the cover 26 toward the housing 12. The glass plate 28 is secured to the outer surface of the cover 26. The recess 29 is provided at the inner peripheral portion of the cover 26. The touch panel 30 is secured to the cover 26 so as to be fitted in the recess 29 on the outer surface of the cover 26. As shown in FIG. 3, each plate-like portion 27 comprises a first surface 27A provided with the first projections 17 and a second surface 27B opposite to the first surface 27A.

The touch panel 30 is constructed by, for example, affixing two transparent electrically conductive films together, and it can detect positions at which it is pressed by a finger or stylus pen.

As shown in FIG. 3, a certain clearance (or gap) 33 is defined between the housing 12 and the cover 26 of the vibration module 14 such that vibration of the vibration module 14 cannot be transmitted to the housing 12. A fixed dimension is secured for the clearance 33 by the function of the sheets 18 to be described below. The clearance 33 is provided around the four sides along the periphery of the vibration module 14.

Figure 4:
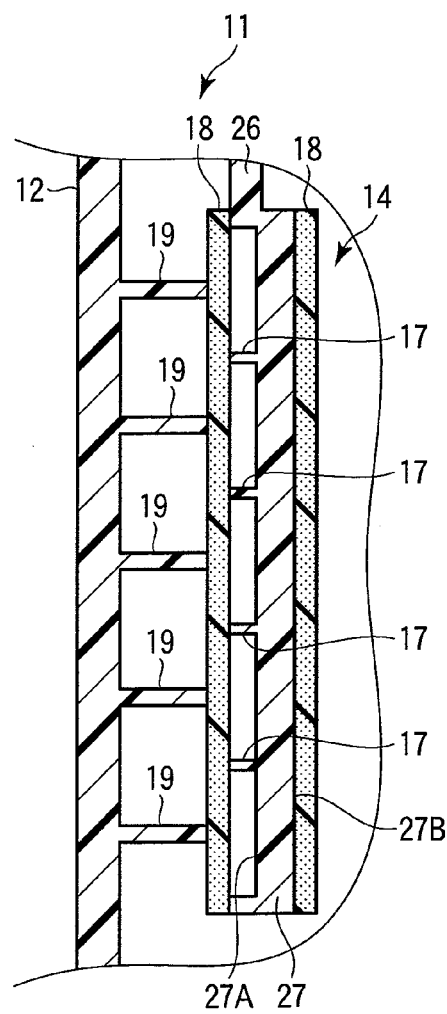
FIG. 4 is an exemplary sectional view of the television apparatus taken along line F4-F4 of FIG. 3.

As shown in FIGS. 3 and 4, each sheet 18 is bonded to the first projections 17 of the first surface 27A and the second surface 27B of each plate-like portion 27. The sheet 18 is secured to the plate-like portion 27 so as to have, for example, a U-shaped cross section. The sheet 18 is an elastic structure of a predetermined thickness. In the present embodiment, for example, the sheet 18 is a sponge-rubber sheet comprising a large number of minute cavities.

Each sheet 18 is bonded to the respective distal end portions of the first projections 17. As shown in FIG. 4, moreover, the second projections 19 abut those parts of the sheet 18 which are located between the first projections 17. In other words, the second projections 19 contact the sheet 18 at positions off the first projections 17. The housing 12 and vibration module 14 are designed so that the sheets 18 are slightly compressed between the first and second projections 17 and 19.

According to the first embodiment, the television apparatus 11 comprises the housing 12, vibration module 14, supporting portions 15, oscillation unit 16, first projections 17, sheets 18, and second projections 19. The vibration module 14 is contained in the housing 12. The supporting portions 15 are mounted on the inner surface of the housing 12 and support the vibration module 14 for vibration. The oscillation unit 16 causes the vibration module 14 to vibrate. The first projections 17 protrude from the vibration module 14 toward the housing 12. The sheets 18 are provided spanning between the respective distal end portions of the first projections 17. The second projections 19 are arranged on the housing 12 and abut those parts of each sheet 18 which are located between the first projections 17.

In general, a kinetic frictional force F (N: Newtons) that acts on a moving object is given by $$F=\mu'N,$$

where N and $\mu'$ are a normal force and dynamic friction factor, respectively. According to the configuration described above, the second projections 19 contact each sheet 18 at positions between the first projections 17, so that those parts of the sheet 18 which are in contact with the second projections 19 are warped. Therefore, the normal force that acts on the second projections 19 can be made very small. Thus, a kinetic frictional force that acts between the second projections 19 and sheet 18 can be minimized to maximally prevent the sheet 18 from being separated from the first projections 17 as the vibration module 14 is attached to or detached from the housing 12. Further, the vibration of the vibration module 14 can be prevented from being transmitted to the housing 12 by means of a simple structure comprising the first projections 17, sheets 18, and second projections 19. Thus, the television apparatus 11 can provide high-quality performance without producing buzz (vibrational noise) in its housing 12. Further, vibration of the housing 12 can be prevented by a contact structure based on the first projections 17, sheets 18, and second projections 19. Unlike a television apparatus that is not based on this structure, therefore, the television apparatus 11 can be configured to minimize the clearance between the housing 12 and vibration module 14. Thus, the appearance of the television apparatus 11 can be improved, and the apparatus housing 12 can be made smaller.

In the present embodiment, moreover, each sheet 18 is bonded to both the first and second surfaces 27A and 27B of each plate-like portion 27. According to this configuration, the sheet 18 can be more effectively prevented from slipping off the plate-like portion 27 when the vibration module 14 is attached to or detached from the housing 12 for the purpose of repair or the like.

Further, each sheet 18 is an elastic structure of the predetermined thickness. The elasticity of the sheet 18 can absorb the dimensional tolerances of the first and second projections 17 and 19 and the like. Since each sheet 18 is formed of sponge rubber, furthermore, it can be prevented more effectively from being separated from the first projections 17 as the vibration module 14 is attached or detached by reducing the dynamic friction factor $\mu'$ and the frictional force that acts between the sheet 18 and second projections 19.

A second embodiment of the electronic apparatus will now be described with reference to FIG. 5. A television apparatus 11 as an example of the electronic apparatus of the second embodiment differs from that of the first embodiment only in the configurations of first projections 17, second projections 19, and sheets 18, and other parts are common to these two embodiments. In the following, therefore, those parts which are different from their counterparts in the first embodiment will be mainly described. Thus, common numbers are used to designate common parts, and a description of those parts is omitted. The television apparatus 11 of the second embodiment is similar in appearance to that shown in FIG. 1.

Figure 5:
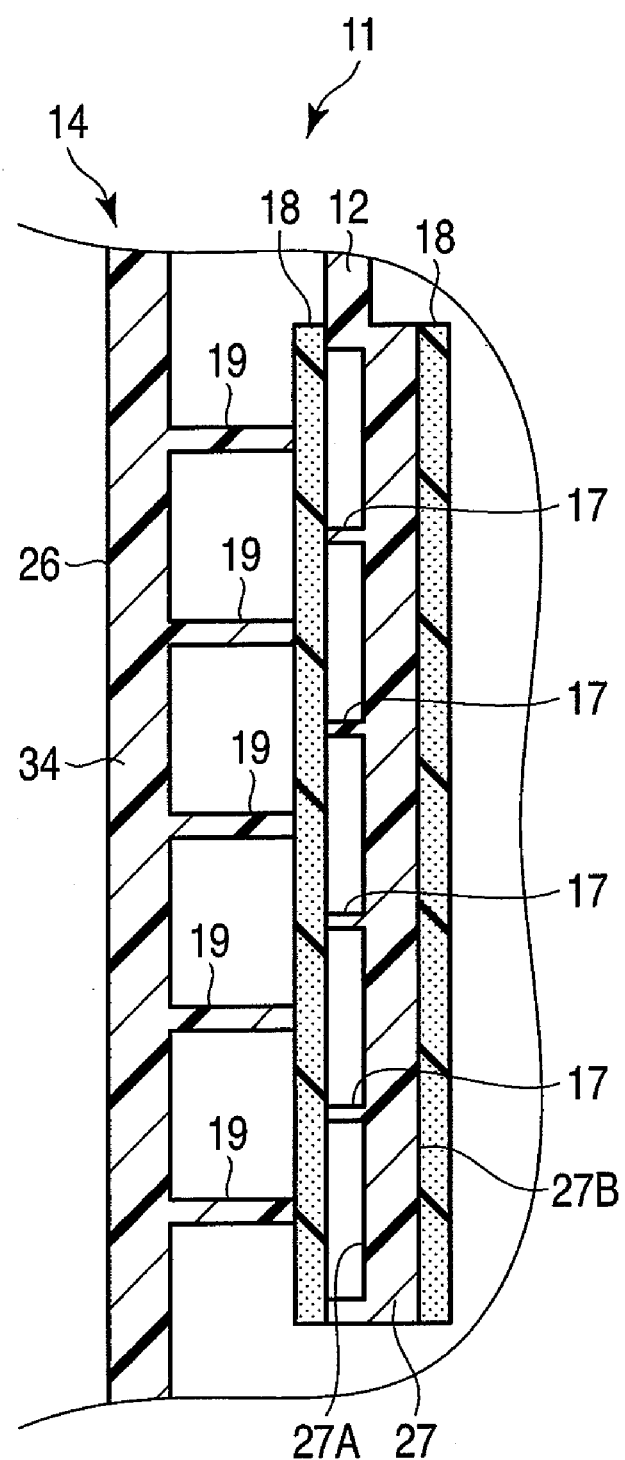
FIG. 5 is an exemplary sectional view showing first and second projections and a sheet of a television apparatus as an example of an electronic apparatus according to a second embodiment.

In the second embodiment, as shown in FIG. 5, each plate-like portion 27 is provided integrally with a housing 12 and protrudes like a rib from the housing 12 toward a vibration module 14. The plate-like portion 27 comprises first and second surfaces 27A and 27B opposite to each other, and first projections 17 are arranged on the first surface 27A. The first projections 17 protrude from the housing 12 toward the vibration module 14.

Further, each sheet 18 is bonded to the respective distal end portions of the first projections 17 so as to span between them. As in the first embodiment, the sheet 18 is bonded to both the first and second surfaces 27A and 27B of the plate-like portion 27. Furthermore, the second projections 19 are arranged on a cover 26 of the vibration module 14. More specifically, the second projections 19 protrude like fins toward the sheet 18 from a vertical wall portion 34, which rises from the cover 26 toward the housing 12. The second projections 19 abut those parts of each sheet 18 which are located between the first projections 17.

According to the second embodiment, the television apparatus 11 comprises the housing 12, vibration module 14, supporting portions 15, oscillation unit 16, first projections 17, sheets 18, and second projections 19. The vibration module 14 is contained in the housing 12. The supporting portions 15 are mounted on the inner surface of the housing 12 and support the vibration module 14 for vibration. The oscillation unit 16 causes the vibration module 14 to vibrate. The first projections 17 protrude from the housing 12 toward the vibration module 14. The sheets 18 are provided spanning between the respective distal end portions of the first projections 17. The second projections 19 are arranged on the vibration module 14 and abut those parts of each sheet 18 which are located between the first projections 17.

Although the first projections 17 are arranged on the housing 12, if each sheet 18 is provided on the respective distal end portions of the first projections 17, according to this configuration, a normal force that acts on the second projections 19 can be made very small to minimize a kinetic frictional force that acts between the second projections 19 and sheet 18. Thus, the sheet 18 can be maximally prevented from being separated from the first projections 17 as the vibration module 14 is attached to or detached from the housing 12.

A third embodiment of the electronic apparatus will now be described with reference to FIGS. 6 to 14. A portable computer 41 as an example of the electronic apparatus of the third embodiment differs from the television apparatus 11 of the first embodiment in external appearance. However, a main configuration is used substantially in common for the first and third embodiments. In the following, therefore, those parts which are different from their counterparts in the first embodiment will be mainly described. Thus, common numbers are used to designate common parts, and a description of those parts is omitted.

Figure 6:
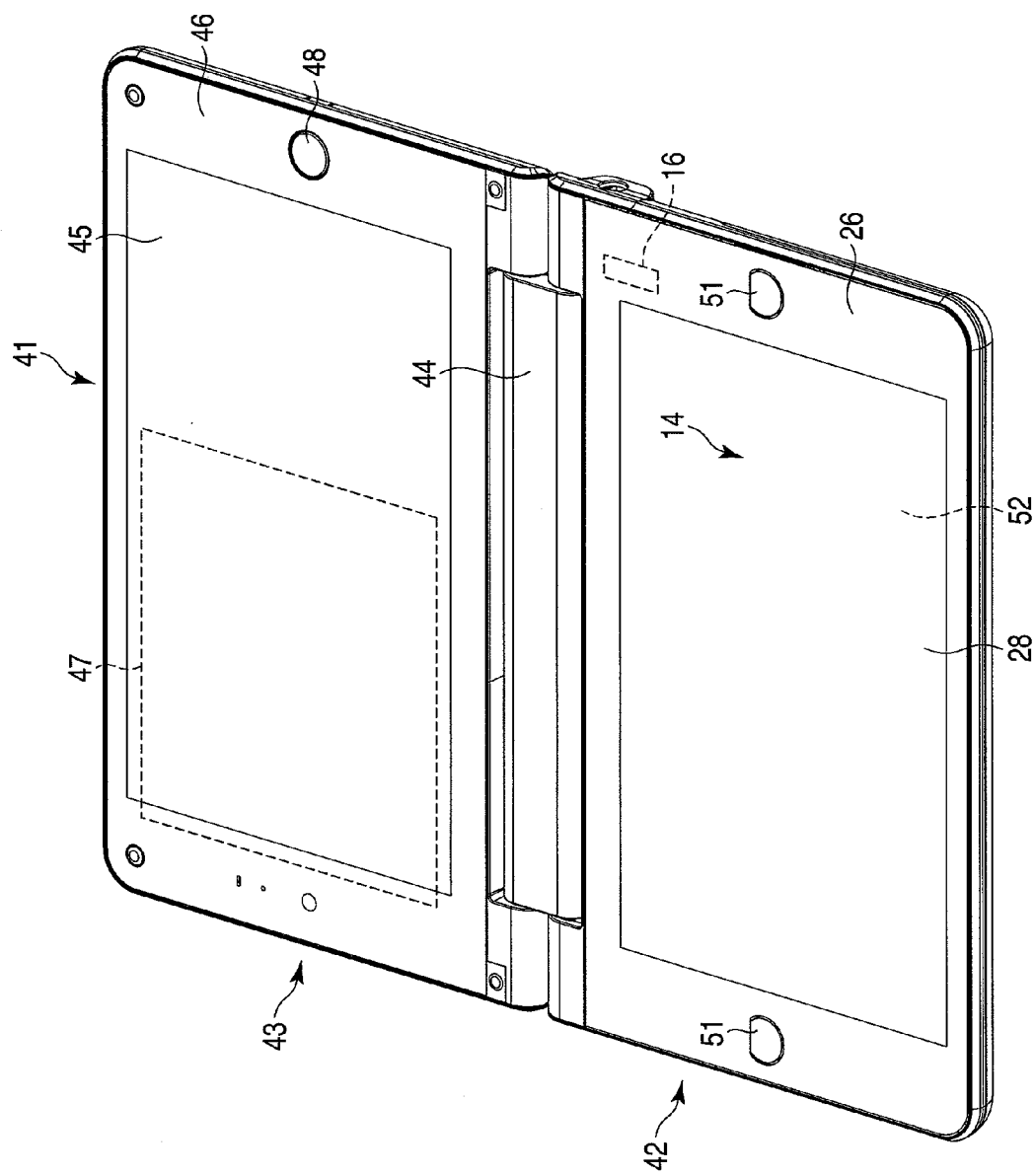
FIG. 6 is an exemplary perspective view showing a portable computer as an example of an electronic apparatus according to a third embodiment.

As shown in FIG. 6, the portable computer 41 comprises a main unit 42, display unit 43, and hinge portion 44 between the units 42 and 43. The hinge portion 44 supports the display unit 43 for rotation.

The display unit 43 comprises a first display 45 and plastic display case 46 that encloses it. The first display 45 is formed of, for example, a liquid crystal display. Further, the display unit 43 comprises a printed circuit board 47 mounted, in its display case 46, with various ROMs, RAM, CPU for generally controlling the portable computer 41, etc. The display case 46 is also provided with a pointing device 48.

The main unit 42 comprises a box-like housing 12 of, for example, a synthetic resin, and a pair of control buttons 51 on a surface of the housing 12.

As shown in FIGS. 6, 7, 9 and 13, the main unit 42 comprises a vibration module 14, supporting portions 15, oscillation unit 16, first projections 17, sheets 18, second projections 19, flat second display 52, battery 53, and insulator 54. The vibration module 14 is attached to the housing 12 for vibration. The supporting portions 15 support the vibration module 14 for vibration. The oscillation unit 16 causes the vibration module 14 to vibrate. The first projections 17 protrude from the vibration module 14 toward the housing 12. The sheets 18 are provided spanning between the respective distal end portions of the first projections 17. The second projections 19 protrude from the housing 12 toward the vibration module 14. The second display 52 is secured to the inner surface of the housing 12. The insulator 54 is interposed between the supporting portions 15 and battery 53. The second display 52 is formed of, for example, a liquid crystal.

Figure 9:
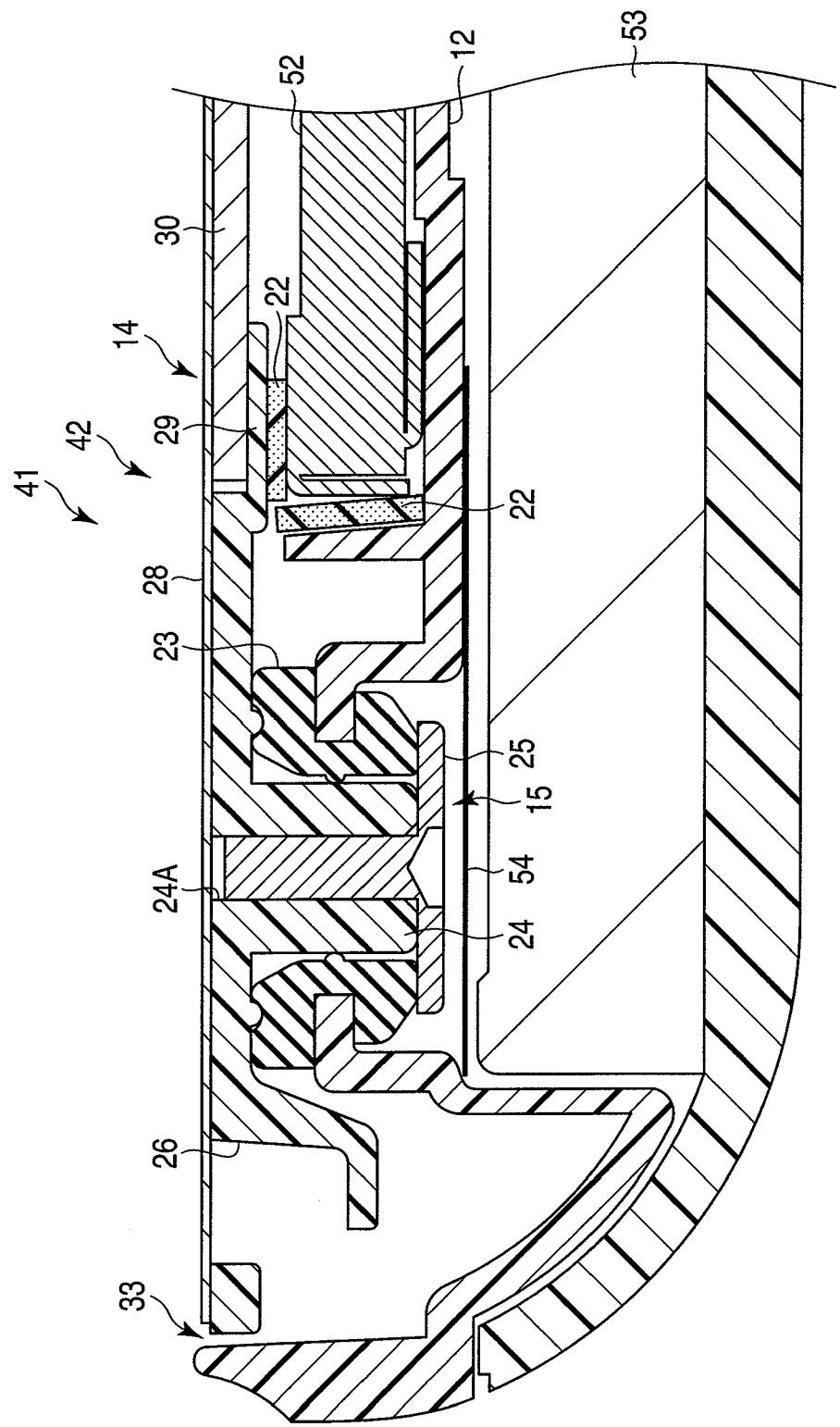
FIG. 9 is an exemplary sectional view of a main unit of the portable computer taken along line F9-F9 of FIG. 7.

As shown in FIG. 9, the second display 52 is secured to the housing 12 and a cover 26 of the vibration module 14 with a cushion member 22, such as a sponge-rubber sheet, between them. The oscillation unit 16 shown in FIG. 6 comprises, for example, a motor and eccentric weight that is rotated by the motor. The oscillation unit 16 is secured to, for example, the vibration module 14.

As shown in FIG. 9, each supporting portion 15 is secured to the housing 12. The supporting portion 15 comprises a ring-like elastic bush 23, cylindrical boss portion 24, and screw 25. The bush 23 is interposed between the vibration module 14 and housing 12. The boss portion 24 protrudes from the cover 26 so as to be fittable into the bush 23. The screw 25 is a fixing member that is fitted in a through-hole 24A in the boss portion 24. The elastic bush 23 is a cylinder of a soft, flexible, elastic material such as elastomer (e.g., synthetic rubber).

As shown in FIGS. 9 and 13, the vibration module 14 is separated from the housing 12. The vibration module 14 can be caused to vibrate independently of the housing 12 by the oscillation unit 16 that is driven in response to a command from the printed circuit board 47 when the control buttons 51 or the like are operated, for example. The vibration module 14 comprises a flat frame-like cover (top cover) 26, square plate-like portions 27, flat glass plate 28, recess 29, and touch panel 30. Each plate-like portion 27 protrudes from the inner surface of the cover 26 toward the housing 12. The glass plate 28 is secured to the outer surface of the cover 26. The recess 29 is provided at the inner peripheral portion of the cover 26. The touch panel 30 is secured to the cover 26 so as to be fitted in the recess 29 on the outer surface of the cover 26.

Figure 10:
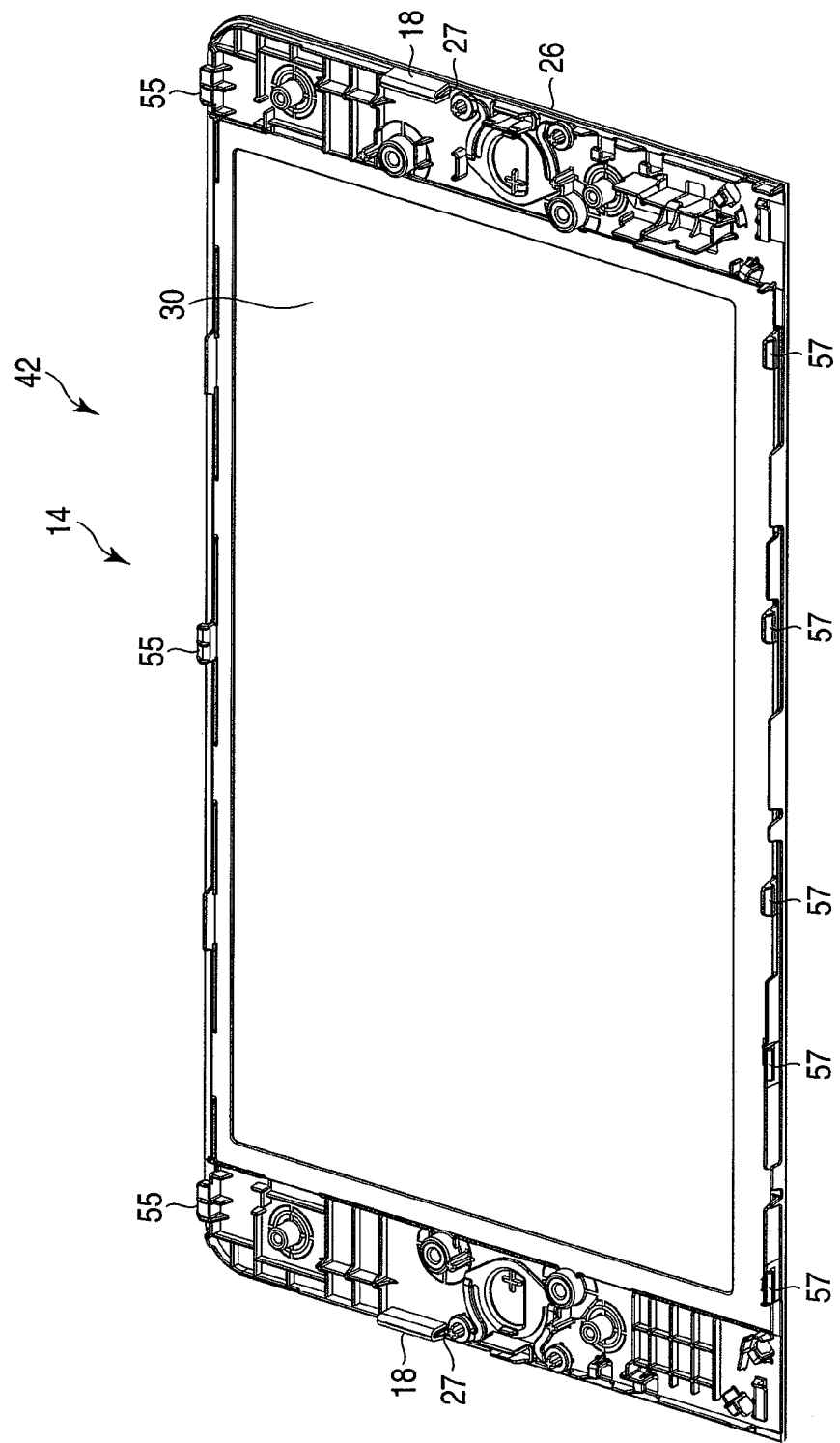
FIG. 10 is an exemplary perspective view of the vibration module of the portable computer of FIG. 7 taken from inside the housing.
Figure 11:
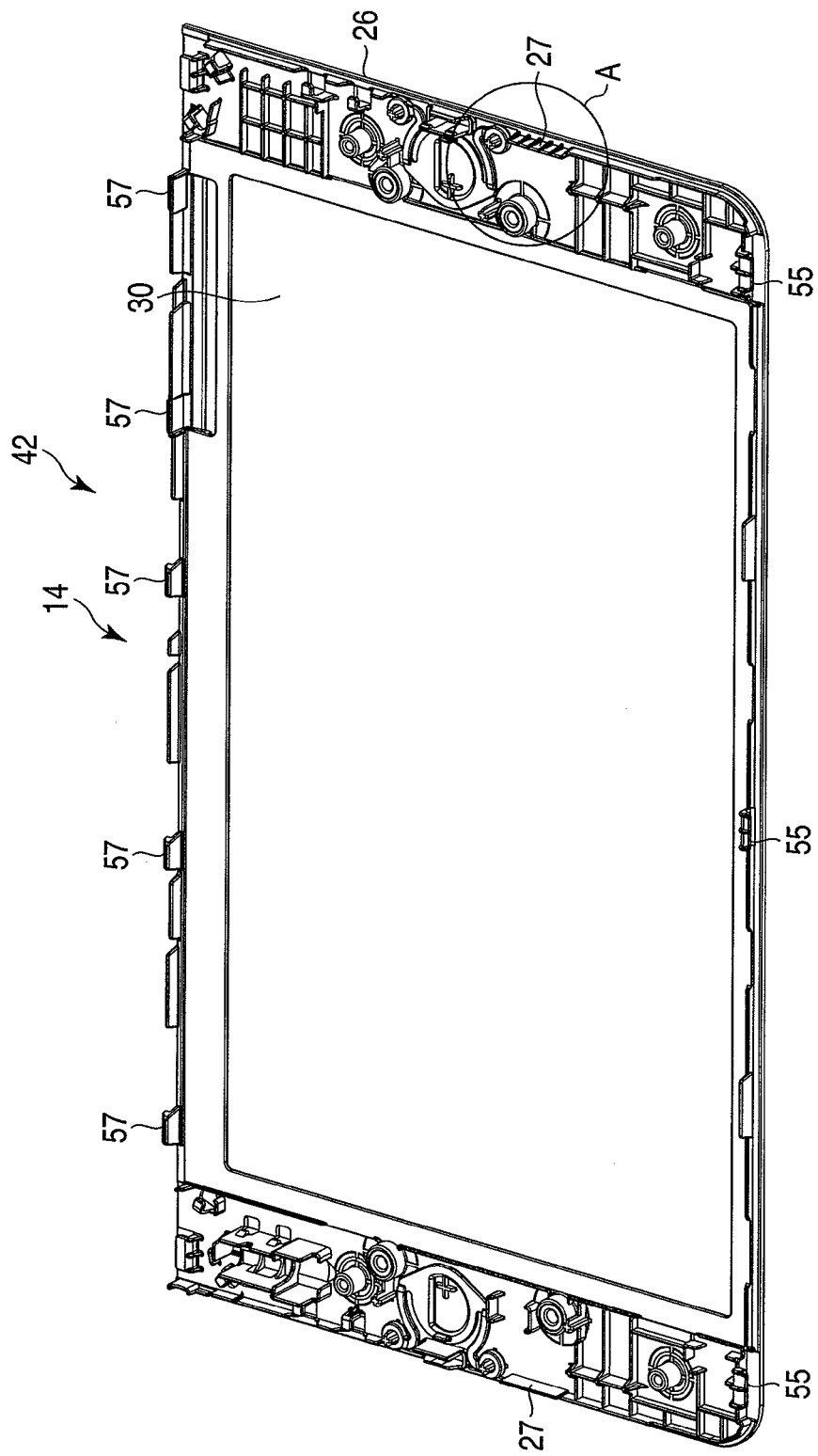
FIG. 11 is an exemplary perspective view of the vibration module of FIG. 10 taken from inside the housing at an angle different from that of FIG. 10 and shows a first plate-like portion cleared of a sheet.
Figure 12:
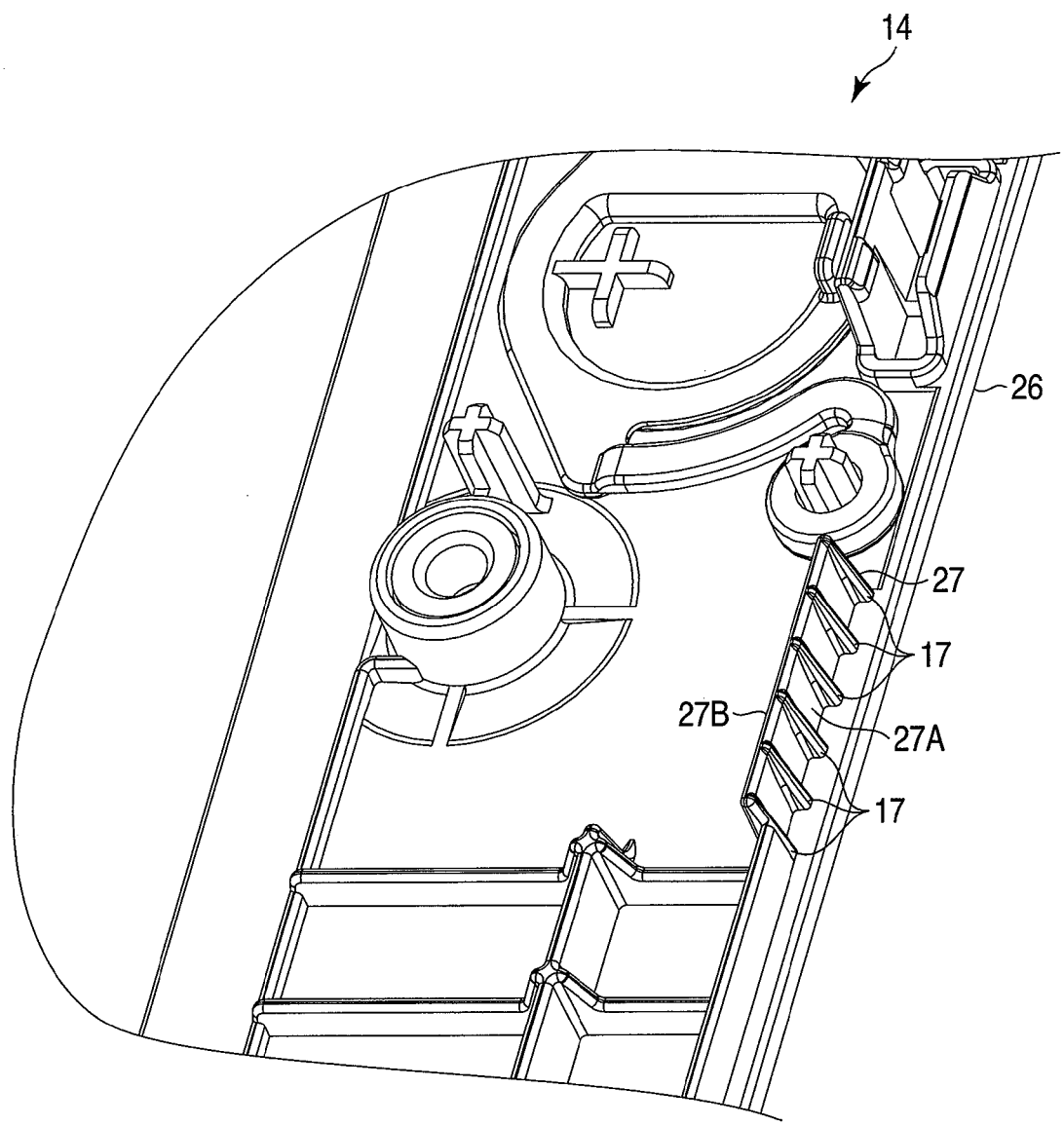
FIG. 12 is an exemplary enlarged perspective view showing a position A of the vibration module shown in FIG. 11.

As shown in FIGS. 11 and 12, each plate-like portion 27 comprises a first surface 27A provided with the first projections 17 and a second surface 27B opposite to the first surface 27A. As shown in FIGS. 10 and 13, each sheet 18 is bonded to the first projections 17 of the first surface 27A and the second surface 27B of each plate-like portion 27. The sheet 18 is secured to the plate-like portion 27 so as to have, for example, a U-shaped cross-section.

As shown in FIG. 13, a certain clearance (or gap) 33 is defined between the cover 26 and housing 12 such that vibration of the vibration module 14 cannot be transmitted to the housing.

As shown in FIG. 14, each sheet 18 is an elastic structure of a predetermined thickness. For example, the sheet 18 is formed of, for example, sponge rubber. Each sheet 18 is bonded to the respective distal end portions the first projections 17. As shown in FIG. 14, moreover, the second projections 19 abut those parts of each sheet 18 which are located between the first projections 17.

Figure 7:
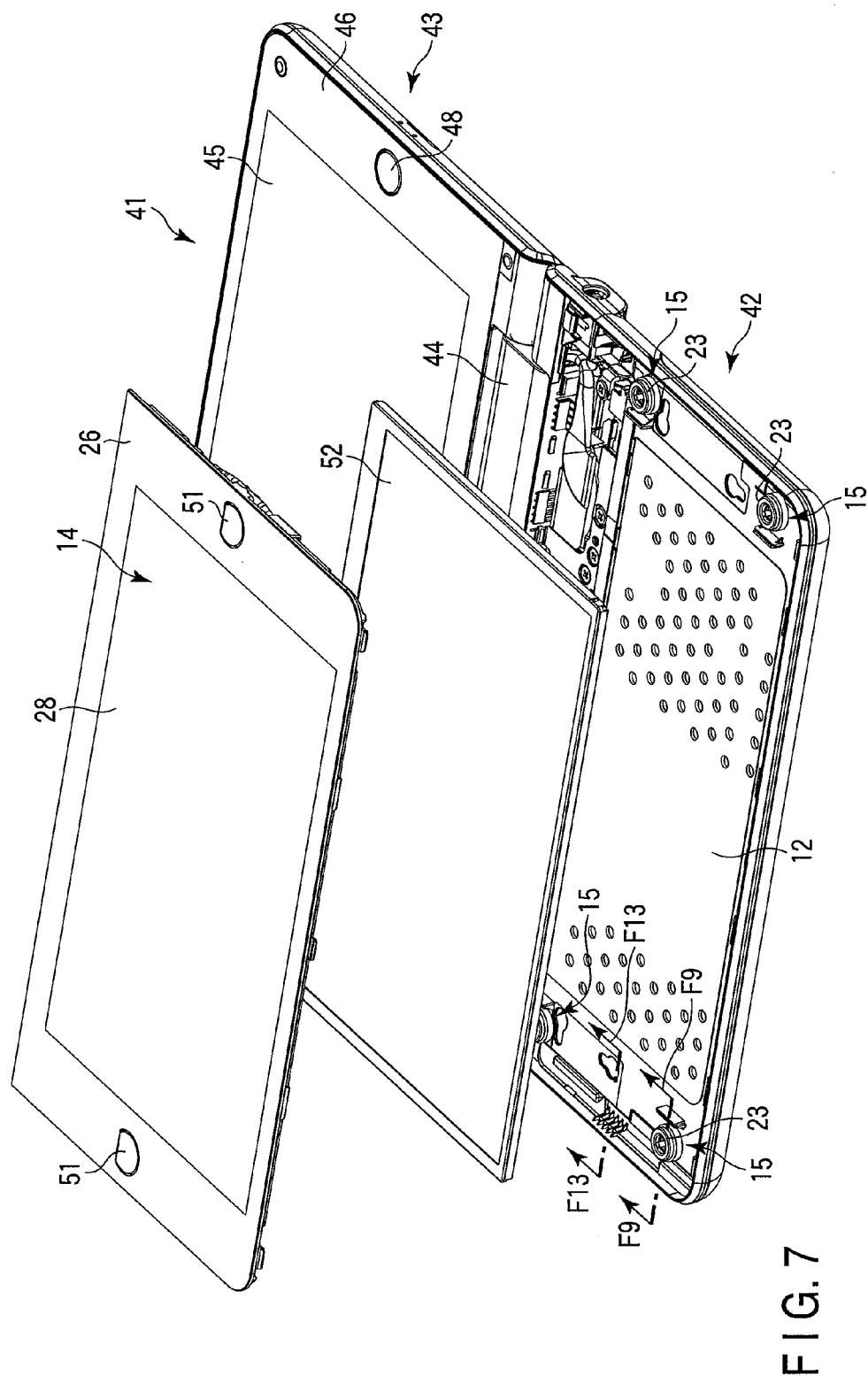
FIG. 7 is an exemplary exploded perspective view showing a vibration module and second display of the portable computer shown in FIG. 6.

Steps of assembling the vibration module 14 to the housing 12 will now be described with reference to FIGS. 7, 8, 10 and 11. First, the second display 52 is mounted in the housing 12, as shown in FIG. 7. Claws 55 shown in FIGS. 10 and 11 are inserted into the underside of catches 56 of the housing 12 shown in FIG. 8. The sheets 18 are bonded individually to the respective peripheries of the catches 56 so as to have a U-shaped cross-section. Then, hooks 57 shown in FIGS. 10 and 11 are engaged individually with sockets 58 of the housing 12 shown in FIG. 8, whereupon assembling the vibration module 14 is easily completed. On the other hand, removal of the module 14 is achieved by removing the claws 55 from the catches 56 after first disengaging the hooks 57 from the sockets 58.

According to the third embodiment, the portable computer 41 comprises the housing 12, vibration module 14, oscillation unit 16, first projections 17, sheets 18, and second projections 19. The vibration module 14 is contained in the housing 12 for vibration. The oscillation unit 16 causes the vibration module 14 to vibrate. The first projections 17 protrude from the vibration module 14 toward the housing 12. The sheets 18 are provided spanning between the respective distal end portions of the first projections 17. The second projections 19 are arranged on the housing 12 and abut those parts of each sheet 18 which are located between the first projections 17.

According to this configuration, the second projections 19 contact each sheet 18 at positions between the first projections 17, so that those parts of the sheet 18 which are in contact with the second projections 19 are warped. Therefore, a normal force that acts on the second projections 19 can be made very small. Thus, a kinetic frictional force that acts between the second projections 19 and sheet 18 can be minimized to maximally prevent the sheet 18 from being separated from the first projections 17 as the vibration module 14 is attached to or detached from the housing 12. Further, the vibration of the vibration module 14 can be prevented from being transmitted to the housing 12 by means of a simple structure comprising the first projections 17, sheets 18, and second projections 19. Thus, the portable computer 41 can provide high-quality performance without producing buzz (vibrational noise) in its housing 12. Further, a contact structure is provided based on the first projections 17, sheets 18, and second projections 19. Unlike a portable computer that is not based on this structure, therefore, the portable computer 41 can be configured to minimize the clearance between the housing 12 and vibration module 14. Thus, the appearance of the portable computer 41 can be improved, and the housing 12 of the computer 41 can be made smaller.

In the present embodiment, moreover, each sheet 18 is bonded to both the first and second surfaces 27A and 27B of each plate-like portion 27. According to this configuration, the sheet 18 can be maximally prevented from slipping off the plate-like portion 27 when the vibration module 14 is attached to or detached from the housing 12 for the purpose of repair or the like.

Further, each sheet 18 is an elastic structure of the predetermined thickness. The elasticity of the sheet 18 can absorb the dimensional tolerances of the first and second projections 17 and 19 and the like. Since each sheet 18 is formed of sponge rubber, furthermore, it can be more effectively prevented from being separated from the first projections 17 as the vibration module 14 is attached or detached by reducing the dynamic friction factor $\mu'$ and the frictional force that acts between the sheet 18 and second projections 19.

A fourth embodiment of the electronic apparatus will now be described with reference to FIG. 15. A portable computer 41 as an example of the electronic apparatus of the fourth embodiment differs from that of the third embodiment only in the configurations of first projections 17, second projections 19, and sheets 18, and other parts are common to these two embodiments. In the following, therefore, those parts which are different from their counterparts in the third embodiment will be mainly described. Thus, common numbers are used to designate common parts, and a description of those parts is omitted. The portable computer 41 of the fourth embodiment is similar in appearance to that shown in FIG. 6.

Figure 15:
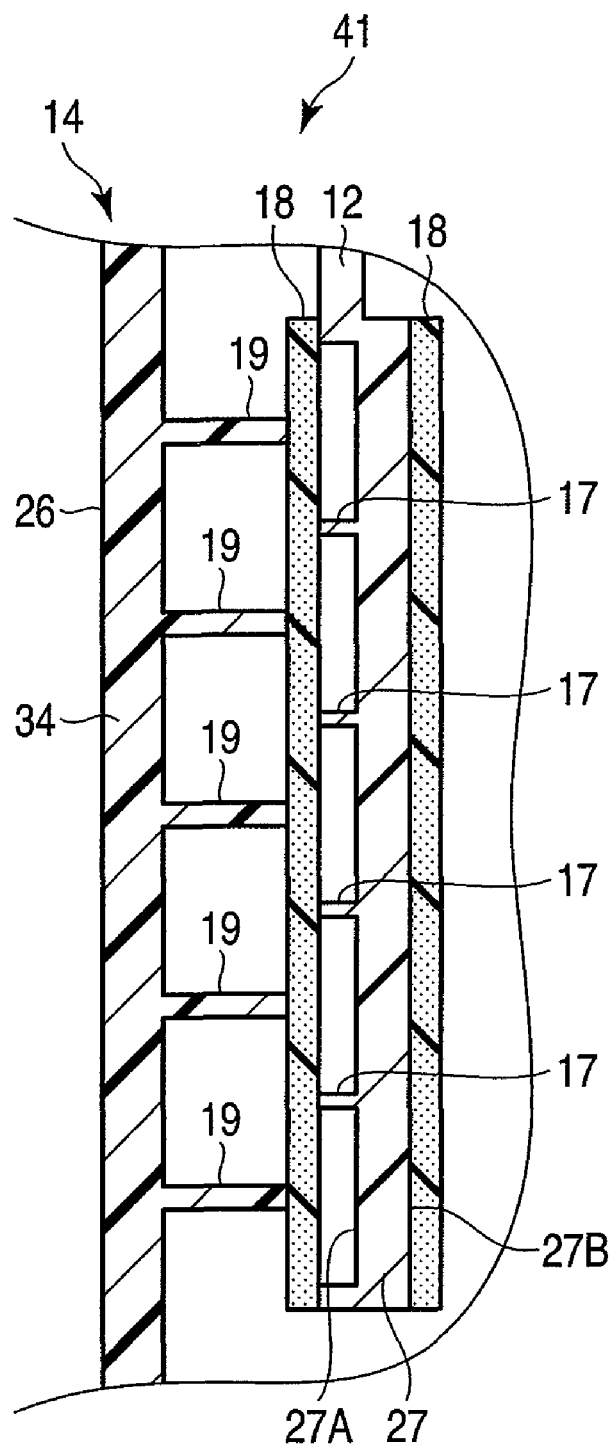
FIG. 15 is an exemplary sectional view showing first and second projections and a sheet of a portable computer as an example of an electronic apparatus according to a fourth embodiment.

As shown in FIG. 15, each plate-like portion 27 is provided integrally with a housing 12 and protrudes like a rib from the housing 12 toward a vibration module 14. The plate-like portion 27 comprises first and second surfaces 27A and 27B opposite to each other, and first projections 17 are arranged on the first surface 27A. The first projections 17 protrude from the housing 12 toward the vibration module 14.

Further, each sheet 18 is bonded to the respective distal end portions of the first projections 17 so as to span between them. As in the third embodiment, the sheet 18 is bonded to both the first and second surfaces 27A and 27B of the plate-like portion 27. Furthermore, the second projections 19 are arranged on a cover 26 of the vibration module 14. More specifically, the second projections 19 protrude like fins toward the sheet 18 from a vertical wall portion 34, which rises from the cover 26 toward the housing 12. The second projections 19 abut those parts of each sheet 18 which are located between the first projections 17.

According to the fourth embodiment, the portable computer 41 comprises the housing 12, vibration module 14, supporting portions 15, oscillation unit 16, first projections 17, sheets 18, and second projections 19. The vibration module 14 is contained in the housing 12. The supporting portions 15 are mounted on the inner surface of the housing 12 and support the vibration module 14 for vibration. The oscillation unit 16 causes the vibration module 14 to vibrate. The first projections 17 protrude from the housing 12 toward the vibration module 14. The sheets 18 are provided spanning between the respective distal end portions of the first projections 17. The second projections 19 are arranged on the vibration module 14 and abut those parts of each sheet 18 which are located between the first projections 17.

Although the first projections 17 are arranged on the housing 12, if each sheet 18 is provided on the respective distal end portions of the first projections 17, according to this configuration, a normal force that acts on the second projections 19 can be made very small to minimize a kinetic frictional force that acts between the second projections 19 and sheet 18. Thus, the sheet 18 can be maximally prevented from being separated from the first projections 17 as the vibration module 14 is attached to or detached from the housing 12.

A fifth embodiment of the electronic apparatus will now be described with reference to FIG. 16. A portable computer 41 as an example of the electronic apparatus of the fifth embodiment differs from the portable computer 41 of the third embodiment in the position where each sheet 18 is bonded to each plate-like portion 27. However, a main configuration is used substantially in common for the third and fifth embodiments. In the following, therefore, those parts which are different from their counterparts in the third embodiment will be mainly described. Thus, common numbers are used to designate common parts, and a description of those parts is omitted. The portable computer 41 of the fifth embodiment is similar in appearance to that shown in FIG. 6.

In the fifth embodiment, each sheet 18 is bonded only to first projections 17 of a first surface 27A of each plate-like portion 27 and not to a second surface 27B. As in the third embodiment, the sheet 18 is formed of, for example, sponge rubber. Each sheet 18 is bonded to the respective distal end portions the first projections 17. As in the third embodiment, moreover, second projections 19 abut those parts of each sheet 18 which are located between the first projections 17.

Although each sheet 18 is bonded only to the first surface 27A of each plate-like portion 27, according to the fifth embodiment, a kinetic frictional force that acts between the second projections 19 and sheet 18 can be minimized. Thus, this structure may be adopted in order to prevent the sheet 18 from being separated from the first projections 17 as the vibration module 14 is attached to or detached from a housing 12.

A sixth embodiment of the electronic apparatus will now be described with reference to FIG. 17. A portable computer 41 as an example of the electronic apparatus of the sixth embodiment differs from the portable computer 41 of the fourth embodiment in the position where each sheet 18 is bonded to each plate-like portion 27. However, a main configuration is used substantially in common for the fourth and sixth embodiments. In the following, therefore, those parts which are different from their counterparts in the fourth embodiment will be mainly described. Thus, common numbers are used to designate common parts, and a description of those parts is omitted. The portable computer 41 of the sixth embodiment is similar in appearance to that shown in FIG. 6.

In the sixth embodiment, each sheet 18 is bonded only to first projections 17 of a first surface 27A of each plate-like portion 27 and not to a second surface opposite to the first surface 27A. As in the fourth embodiment, the sheet 18 is formed of, for example, sponge rubber. Each sheet 18 is bonded to the respective distal end portions of the first projections 17. As in the fourth embodiment, moreover, second projections 19 abut those parts of each sheet 18 which are located between the first projections 17.

Although each sheet 18 is bonded only to the first projections 17 of the first surface 27A of each plate-like portion 27, according to the sixth embodiment, a kinetic frictional force that acts between the second projections 19 and sheet 18 can be minimized. Thus, this structure may be suitably adopted in order to prevent the sheet 18 from being separated from the first projections 17 as the vibration module 14 is attached to or detached from a housing 12.

A seventh embodiment of the electronic apparatus will now be described with reference to FIG. 18. A portable computer 41 as an example of the electronic apparatus of the seventh embodiment differs from the portable computer 41 of the third embodiment in the position where each sheet 18 is bonded to a plate-like portion and the like. However, a main configuration is used substantially in common for the third and seventh embodiments. In the following, therefore, those parts which are different from their counterparts in the third embodiment will be mainly described. Thus, common numbers are used to designate common parts, and a description of those parts is omitted. The portable computer 41 of the seventh embodiment is similar in appearance to that shown in FIG. 6.

As shown in FIG. 18, a cover 26 of a vibration module 14 comprises a first plate-like portion 61 that protrudes like a rib toward a housing 12. The first plate-like portion 61 comprises a first surface 61A on which first projections 17 are arranged and a second surface 61B opposite to the first surface 61A. The first projections 17 protrude from the first surface 61A of the first plate-like portion 61 toward the housing 12. Each sheet 18 is bonded to the first projections 17.

Further, the housing 12 comprises a second plate-like portion 62 that protrudes like a rib toward the vibration module 14. The second plate-like portion 62 comprises a third surface 62A on which second projections 19 are arranged and a fourth surface 62B opposite to the third surface 62A. As in the third embodiment, the second projections 19 abut those parts of each sheet 18 which are located between the first projections 17.

Although the second projections 19 are formed on the second plate-like portion 62 of the housing 12, according to the seventh embodiment, a kinetic frictional force that acts between the second projections 19 and sheet 18 can be minimized. Thus, this structure may also be adopted in order to prevent the sheet 18 from being separated from the first projections 17 as the vibration module 14 is attached to or detached from the housing 12.

An eighth embodiment of the electronic apparatus will now be described with reference to FIG. 19. A portable computer 41 as an example of the electronic apparatus of the eighth embodiment differs from the portable computer 41 of the fourth embodiment in the position where each sheet 18 is bonded to a plate-like portion. However, a main configuration is used substantially in common for the fourth and eighth embodiments. In the following, therefore, those parts which are different from their counterparts in the fourth embodiment will be mainly described. Thus, common numbers are used to designate common parts, and a description of those parts is omitted. The portable computer 41 of the eighth embodiment is similar in appearance to that shown in FIG. 6.

As shown in FIG. 19, a housing 12 comprises a first plate-like portion 61 that protrudes like a rib toward a vibration module 14. The first plate-like portion 61 comprises a first surface 61A on which first projections 17 are arranged and a second surface 61B opposite to the first surface 61A. The first projections 17 protrude from the first surface 61A of the first plate-like portion 61 toward the vibration module 14. Each sheet 18 is bonded to the first projections 17.

Further, a cover 26 of the vibration module 14 comprises a second plate-like portion 62 that protrudes like a rib toward the housing 12. The second plate-like portion 62 comprises a third surface 62A on which second projections 19 are arranged and a fourth surface 62B opposite to the third surface 62A. The second projections 19 protrude from the vibration module 14 toward the housing 12. As in the fourth embodiment, the second projections 19 abut those parts of each sheet 18 which are located between the first projections 17.

Although the second projections 19 are formed on the second plate-like portion 62 of the cover 26 of the vibration module 14, according to the eighth embodiment, a kinetic frictional force that acts between the second projections 19 and sheet 18 can be minimized. Thus, this structure may also be adopted in order to prevent the sheet 18 from being separated from the first projections 17 as the vibration module 14 is attached to or detached from the housing 12.

The electronic apparatus is not limited to the television apparatus 11 and portable computer 41 of the embodiments described herein, and may naturally be applied to other electronic apparatuses, such as a cell phone. It is to be understood, moreover, that the electronic apparatus may be variously modified without departing from the spirit or scope of the invention.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An electronic device comprising:
   a housing;
   a vibration module attached to the housing and configured to vibrate;
   a plurality of first projecting portions projecting from either the vibration module or the housing toward the other of the vibration module and the housing;
   a sheet provided to span distal ends of the plurality of first projecting portions; and
   a plurality of second projecting portions provided on the other of the vibration module and the housing, and abutting the sheet at positions between the first projecting portions.

2. An electronic device comprising:
   a housing;
   a module attached to the housing and configured to vibrate;
   a first projecting portion projecting from either the module or the housing toward the other of the module and the housing;
   a second projecting portion projecting from the other of the module and the housing toward either of the module and the housing, at a position off the first projecting portion; and
   a buffering portion provided between the first projecting portion and the second projecting portion.

3. The electronic device of claim 2, wherein either of the module and the housing comprises a plate-like portion, the plate-like portion comprising a first surface on which the first projecting portion is provided, and a second surface opposite to the first surface, wherein the buffering portion is bonded to both the first and second surfaces.

4. The electronic device of claim 2, wherein the buffering portion comprises a sheet comprising a predetermined thickness with elasticity.

5. The electronic device of claim 2, wherein the buffering portion comprises a sponge-rubber sheet.

6. The electronic device of claim 2, wherein a display panel is secured in the housing, and the module comprises a touch panel covering the display panel and a cover to which the touch panel is secured.

7. The electronic device of claim 2, wherein the buffering portion comprises an elastic sheet.

8. The electronic device of claim 2, wherein the module is configured to vibrate independently of the housing, by an oscillation unit secured to the module.

9. The electronic device of claim 2, wherein the module is attached to the housing by a supporting portion comprising an elastic material having elasticity.

10. The electronic device of claim 2, wherein the buffering portion is located in the housing.

11. An electronic device comprising:
    a housing;
    a module attached to the housing so as to displace;
    a projecting portion projecting from either the module or the housing toward the other of the module and the housing;
    a buffering portion provided between a distal end of the projecting portion and the other of the module and the housing; and
    a plate-like portion comprising a first surface on which the projecting portion is provided, and a second surface opposite to the first surface,
    wherein the buffering portion is bonded to both the first and second surfaces.

12. The electronic device of claim 11, wherein the buffering portion comprises a sheet having a predetermined thickness with elasticity.

13. The electronic device of claim 11, wherein the buffering portion comprises a sponge-rubber sheet.

14. The electronic device of claim 11, wherein a display panel is secured in the housing, and the module comprises a touch panel covering the display panel and a cover to which the touch panel is secured.

15. The electronic device of claim 11, wherein the buffering portion comprises an elastic sheet.

16. The electronic device of claim 11, wherein the module is configured to vibrate independently of the housing, by an oscillation unit secured to the module.

17. The electronic device of claim 11, wherein the module is attached to the housing by a supporting portion comprising an elastic material having elasticity.

18. The electronic device of claim 11, wherein the buffering portion is located in the housing.

* * * * *